United States Patent

Hillery et al.

[11] Patent Number: 6,081,822
[45] Date of Patent: Jun. 27, 2000

[54] APPROXIMATING SIGNAL POWER AND NOISE POWER IN A SYSTEM

[75] Inventors: William J. Hillery, Santa Clara; V. Rao Sattiraju, Union City, both of Calif.

[73] Assignee: Agilent Technologies, Inc., Palo Alto, Calif.

[21] Appl. No.: 09/038,082

[22] Filed: Mar. 11, 1998

[51] Int. Cl.[7] .............................. G06F 7/38; G06F 17/10; G06F 7/00

[52] U.S. Cl. ........................ 708/445; 708/320; 708/200

[58] Field of Search ................... 708/445, 320, 708/200–201, 670, 300

[56] References Cited

U.S. PATENT DOCUMENTS

| | | | |
|---|---|---|---|
| 4,075,703 | 2/1978 | Dillard | 708/445 |
| 4,193,118 | 3/1980 | Nash et al. | 708/445 |
| 4,606,009 | 8/1986 | Wiesmann | 708/445 |
| 4,789,953 | 12/1988 | Gerrath | 708/445 |
| 5,052,027 | 9/1991 | Poklemba et al. | 708/445 |
| 5,068,818 | 11/1991 | Uramoto et al. | 708/445 |
| 5,930,290 | 7/1999 | Zhou et al. | 375/200 |

*Primary Examiner*—Tan V. Mai

[57] ABSTRACT

An electronic system with power approximation for circuit savings. Power approximation is provided by means for generating an absolute value of a real part of a signal, means for generating an absolute value of an imaginary part of the signal, means for generating a sum of the absolute values, and means for performing an averaging function on the sum such that a result of the averaging function provides an approximate power which indicates an actual power of the signal. The approximate power enables a determination of actual signal-to-noise ratio in the electronic system and a determination of a variety of other signal-to-noise determinations without the use of multipliers.

16 Claims, 4 Drawing Sheets

APPROXIMATING SIGNAL POWER AND NOISE POWER IN A SYSTEM

BACKGROUND OF THE INVENTION

1. Field of Invention

The present invention pertains to the field of electronic systems. More particularly, this invention relates to approximating signal power and noise power in a system.

2. Art Background

A useful function in an electronic system is the determination of signal power and noise power. A determination of signal power and noise power may be used to determine signal-to-noise ratio (SNR) for an electronic system. For example, a determination of SNR in a communication system may be useful for characterizing the quality of a communication channel. In addition, an SNR determination may be useful for determining whether a receiving station is obtaining reliable data in the face of communication channel noise.

The signal in a communication system commonly includes an in-phase component and a quadrature component. The in-phase and quadrature components are typically represented by a complex signal. A complex signal usually has a real part that represents the in-phase component of the signal and imaginary part that represents the quadrature component of the signal. A signal power determination usually involves the calculation of squared terms for both the real and imaginary parts of the complex signal. Similarly, a noise power determination typically involves the calculation of squared terms for both the real and imaginary parts of the complex noise. Typically, such squared terms are calculated using one or more multipliers.

Unfortunately, the multipliers employed to calculate the squared terms for signal power and noise power typically require a relatively large area of integrated circuit die space to implement. This is the case particularly for high speed systems in which large numbers of gates are typically used to implement a multiplier. Such large areas of die space usually increase the cost of integration circuit fabrication and increase the overall costs of electronic systems that make use of signal-to-noise ratio determinations.

SUMMARY OF THE INVENTION

An electronic system with power approximation for circuit savings is disclosed. Power approximation is provided by means for generating an absolute value of a real part of a signal, means for generating an absolute value of an imaginary part of the signal, means for generating a sum of the absolute values, and means for performing an averaging function on the sum such that a result of the averaging function provides an approximate power which indicates an actual power of the signal. The approximate power enables a determination of actual signal-to-noise ratio in the electronic system and a determination of a variety of other signal-to-noise determinations without the use of multipliers.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
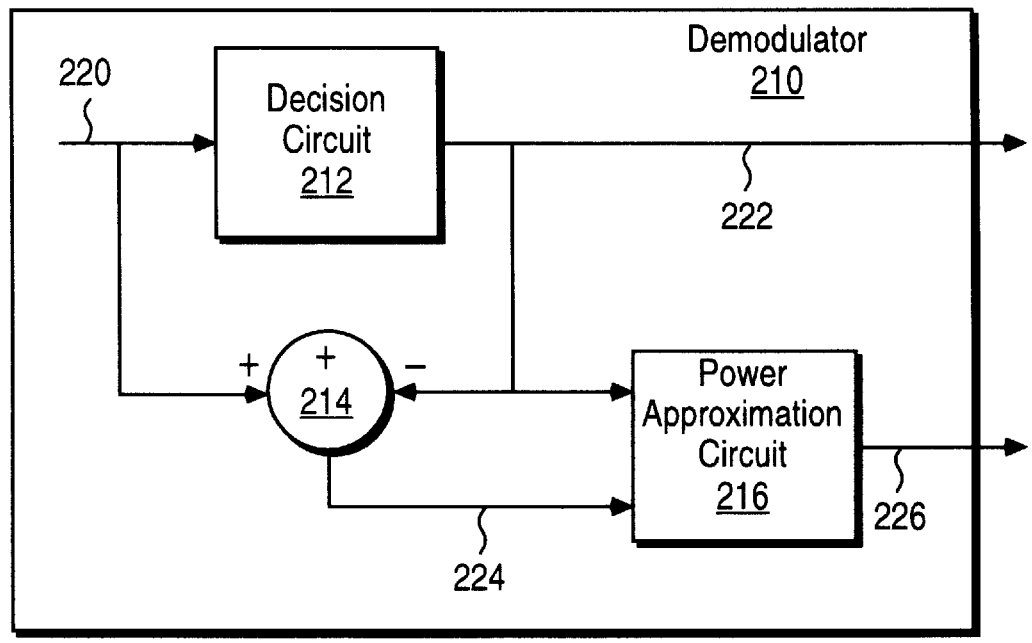
FIG. 1 illustrates a demodulator which performs power approximation according to the present techniques.

FIG. 1 illustrates a demodulator 210 with power approximation according to the present techniques. For purposes of illustrating the present techniques, the elements of the demodulator 210 involved in power approximation include a decision circuit 212, a summing circuit 214, and a power approximation circuit 216. In one embodiment, the demodulator 210 is a quadrature amplitude modulation (QAM) demodulator.

The decision circuit 212 generates an output signal 222 in response to an input signal 220 which is derived from an input signal received over a communication channel associated with the demodulator 210. The input signal received over the communication channel is processed using RF receiving circuitry, analog-to-digital conversion circuitry, filter circuitry, a down converter, and other types of circuitry prior to reaching the decision circuit 212 as the input signal 220. The down converter brings the input signal down to a baseband and separates it into its real and imaginary components.

The input signal 220 includes a series of complex values each of which includes a real part and an imaginary part. The decision circuit 212 generates an output signal 222 in response to the input signal 220 by matching the complex values contained in the input signal 220 to a set of predetermined QAM constellation points associated with the demodulator 210. The output signal 222 includes a series of complex values selected from the QAM constellation points each of which includes a real part and an imaginary part. Each complex value of the input signal 220 or the output signal 222 may be represented as follows:

$$x_i + jy_i$$

where x is the real part, y is the imaginary part, and i represents an index to the time samples of the input signal 220 or the output signal 222.

The summing circuit 214 generates a noise signal 224 which indicates a difference between the output signal 222 and the input signal 220. The noise signal 224 is also a complex signal which may be represented as follows:

$$n1_i + jn2_i$$

where n1 is the real part, n2 is the imaginary part, and i represents an index to the time samples of the noise signal 224.

In a determination of actual SNR without the approximation techniques disclosed herein, the actual signal power of the output signal 222 may be represented with the following equation:

$$S = E(x_i^2 + y_i^2)$$

where S is the actual signal power of the output signal 222 and E is an expectation function.

Similarly, the actual noise power of the noise signal 224 may be represented by the following equation:

$$N = E(n1_i^2 + n2_i^2)$$

where N is the actual noise power of the noise signal 224 and E is an expectation function.

Such a calculation of actual signal power S and actual noise power N would normally require at least one multiplier circuit for the calculation of the $x_i^2$, $y_i^2$, $n1_i^2$, and $n2_i^2$ terms. For a high speed system, more than one multiplier circuit would be needed. Such multiplier circuits consume large numbers of gates in the demodulator 210. So instead, the power approximation circuit 216 implements an approximate signal power calculation according to the following equation (equation 1):

$$\tilde{S} = E^2(|x_i| + |y_i|)$$

where $\tilde{S}$ is the approximate signal power of the output signal 222 and E is an expectation function which is performed by an averaging filter.

Similarly, the power approximation circuit 216 performs an approximate noise power calculation according to the following equation (equation 2):

$$\tilde{N} = E^2(|n1_i| + |n2_i|)$$

where $\tilde{N}$ is the approximate noise power of the noise signal 224 and E is an expectation function which is performed by an averaging filter.

The following analysis is undertaken in order to demonstrate the characteristics of the approximations yielded by equations 1 and 2 with respect to their usefulness in SNR related determinations. Consider that in conditions of relatively high SNR in the demodulator 210, that is where the ratio of actual signal power to actual noise power is relatively high, the actual noise power of the noise signal 224 may be represented as follows (equation 3)

$$N = 2\sigma^2$$

where $\sigma^2$ is the variance of noise in one dimension.

This is the case because the noise associated with a communication channel may be approximated by a gaussian function. The actual noise power given by equation 3 may be compared to a calculation of the approximate noise power according to the following:

$$\tilde{N} = E^2(|n1_i| + |n2_i|).$$

This equation may be expanded as follows:

$$\tilde{N} = E^2(|n1_i|) + E^2(|n2_i|) + 2E^2(|n1_i||n2_i|).$$

The $n1_i$ and $n2_i$ terms should be uncorrelated. If $n1_i$ and $n2_i$ are uncorrelated then $$E(|n1_i||n2_i|) = E(|n1_i|)E(|n2_i|).$$

In addition, $$E(|n1_i|) = E(|n2_i|)$$

since both are identically distributed. Thus for a relatively high actual SNR the approximate noise power may be represented as follows:

$$\tilde{N} = 4E^2(|n1_i|).$$

The solution is provided below.

$$E(|n1_i|) = \int_{-\infty}^{\infty} |x| f(x) dx$$

f(x) is a Gaussian probability distribution function. Thus $$E(|n1_i|) = \int_{-\infty}^{\infty} \frac{1}{\sigma\sqrt{2\pi}} |x| e^{\frac{-x^2}{2\sigma^2}} dx$$

and $$E(|n1_i|) = \frac{2}{\sigma\sqrt{2\pi}} \int_{0}^{\infty} x e^{\frac{-x^2}{2\sigma^2}} dx = \sigma\sqrt{\frac{2}{\pi}}.$$

Therefore $$\tilde{N} = 4\sigma^2 \frac{2}{\pi} = \frac{8}{\pi}\sigma^2 = 1.27N.$$

It can now be seen that the ratio between approximate noise power $\tilde{N}$ and actual noise N approaches 1.27 as the SNR increases. As a consequence, a direct mapping may be constructed between the actual noise power needed for an actual SNR determination and the approximate noise power rendered by the power approximation circuit 216 for increasing SNR conditions. This is important since an increasing SNR in the demodulator 210 is a critical time in which adaptive equalizer circuitry is converging to a point at which the output signal 222 may be said to carry "good" data. It is important under such conditions that the relationship between the approximate noise power N and the actual noise power N be monotonic and readily determinable.

On the other hand, as the SNR in the demodulator 210 decreases, that is as the ratio of actual signal power to actual noise power decreases, the density of error in decisions rendered by the decision circuit 212 becomes uniform in the interior of the QAM constellation associated with the demodulator 210. Assuming such a uniform distribution and ignoring the fringe of the constellation, i.e. $f(x) = 1$ $-0.5 \leq x \leq 0.5$, it can be seen that with regard to the actual noise power $$N \cong 2E(n1_i^2) = 2E(n2_i^2) = 2\int_{-0.5}^{0.5} x^2 dx = 2\frac{(0.5)^3 + (0.5)^3}{3} = \frac{1}{6}.$$

Also in conditions of relatively low SNR $$\tilde{N} \cong 4E^2(|nI_i|) = 4\left[\int_{-0.5}^{0.5}|x|dx\right]^2 = 4\left[2\int_{0}^{0.5}xdx\right]^2 = \frac{1}{4}.$$

Thus, for a relatively low SNR $$\tilde{N}=1.5N.$$

In addition, as the SNR continues to decrease, the actual noise power N rises faster than the approximate noise power $\tilde{N}$. This is a consequence of the fact that contributions to the actual noise power N near the edge are a function $x^2$ and $y^2$ while the contributions for the approximate noise power $\tilde{N}$ are linear in x and y. Therefore, for very low SNR, $$\tilde{N}>N.$$

Moreover, the approximate signal power $\tilde{S}$ rises as signal power S rises. When convergence has completed, the approximate signal power $\tilde{S}$ equals 16 and the signal power S equals 10.5, for 64QAM. If $\tilde{S}$ is not near 16 then it is an indication of unreliability of output data.

This analysis demonstrates a predictable relationship between approximate noise power $\tilde{N}$ and actual noise power N for differing SNR values. This predictable relationship may be used to map the approximate noise power $\tilde{N}$ generated by the power approximation circuit 216 into the actual noise power N. This mapping may be implemented in a variety of ways including hardware or software lookup tables.

Table 1 summarizes the relationship between approximate noise power $\tilde{N}$ and actual noise power N for differing SNR values as provided by the above analysis. This table applies to a 64-QAM system. Simulation results for other constellations differ but are readily adapted to using the techniques disclosed herein.

TABLE 1

| SNR (db) | $\tilde{N}$ | N | K = $\tilde{N}$/N |
|---|---|---|---|
| 0.0 | 1.53 | 2.42 | 0.63 |
| 2.0 | 0.95 | 1.38 | 0.69 |
| 4.0 | 0.65 | 0.83 | 0.78 |
| 6.0 | 0.49 | 0.53 | 0.92 |
| 8.0 | 0.40 | 0.37 | 1.07 |
| 10.0 | 0.34 | 0.28 | 1.21 |
| 12.0 | 0.30 | 0.23 | 1.34 |
| 14.0 | 0.27 | 0.20 | 1.41 |
| 16.0 | 0.23 | 0.17 | 1.41 |
| 18.0 | 0.18 | 0.13 | 1.37 |
| 20.0 | 0.13 | 0.10 | 1.32 |
| 22.0 | 0.08 | 0.07 | 1.29 |
| 24.0 | 0.05 | 0.04 | 1.27 |
| 26.0 | 0.03 | 0.03 | 1.27 |
| 28.0 | 0.02 | 0.02 | 1.27 |
| 30.0 | 0.01 | 0.01 | 1.27 |

The contents of Table 1 were obtained with Monte Carlo simulations of true noise power N and the approximate noise power $\tilde{N}$ by assuming various SNR values as given in the first column of the table where SNR=$10\log_{10}$S/N, i.e. S and N are actual powers. The constellation point spacing was 1.0.

The contents of Table 1 enable a direct mapping between the actual or true noise power N and the approximate noise power $\tilde{N}$. Taken together, these provide a direct mapping between actual or true SNR and approximate SNR since actual SNR is the ratio between actual signal power S and actual noise power N and since approximate SNR is the ratio between approximate signal power $\tilde{S}$ and approximate noise power $\tilde{N}$. These direct mappings enable a variety of useful applications of the approximations rendered by the power approximation circuit 216.

The following is a procedure for determining an actual SNR in the demodulator 210 in response to an approximate noise power $\tilde{N}$ rendered by the power approximation circuit 216 and carried on the signal line 226. This procedure may be carried out by a processor external to the demodulator 210 or by circuitry contained within the demodulator 210. First, the contents of Table 1 are used to find a value K=$\tilde{N}$/N which corresponds to the $\tilde{N}$ value carried on the signal line 226. For example, an $\tilde{N}$ value of 0.128 corresponds to K=$\tilde{N}$/N value from Table 1 of 1.32. Next, an actual SNR which corresponds to the $\tilde{N}$ value carried on the signal line 226 is determined according to the following equation:

$$SNR = 10\log_{10}\frac{S_0}{K\tilde{N}}$$

where $S_0$ is the signal power of the particular embodiment of the QAM demodulator 210. For example, in a 64-QAM constellation, S=10.5 (assuming a constellation spacing of 1.0).

The procedure for determining an actual SNR in the demodulator 210 in response to an $\tilde{N}$ value rendered by the power approximation circuit 216 outlined above may be used to construct a lookup table for converting between $\tilde{N}$ values generated by the power approximation circuit 216 and corresponding actual SNR values. This lookup table may be stored in the demodulator 210 and enable the demodulator 210 to generate actual SNR values "on-chip."

Alternatively, this lookup table may be implemented by an external processor that performs an SNR monitoring function for the demodulator 210 by obtaining $\tilde{N}$ values via the signal line 226 and using the lookup table to generate actual SNR values in response to the $\tilde{N}$ values obtained via the signal line 226. In yet another alternative, an external processor may obtain square-root ($\tilde{N}$) approximate values via the signal line 226 and use the lookup table to generate actual SNR values.

In addition, the approximate noise power $\tilde{N}$ values or the square-root($\tilde{N}$) approximate values carried on the signal line 226 from the power approximation circuit 216 may be used to detect one or more SNR thresholds that control various functions in the demodulator 210. For example, one or more SNR thresholds may used to control switching among differing algorithms with which an equalizer in the demodulator 210 adapts to interference in a communication channel.

The following is a procedure for determining an approximate SNR threshold value (SNRT) which corresponds to a desired actual SNR threshold value (SNRT). First, an actual noise power N is determined for the desired actual SNR threshold value SNRT according to the following:

$$N = S_0 10^{\frac{-S\tilde{N}RT}{10}}$$

where $S_0=10.5$ for a 64-QAM constellation.

Next, the contents of Table 1 are used to find a value $K=\tilde{N}/N$ which corresponds to this desired actual noise power N. Then the approximate SNR threshold value $S\tilde{N}RT$ is determined according to the following:

$$S\tilde{N}RT = \frac{\sqrt{\tilde{S}}}{\sqrt{S 10^{\frac{-S\tilde{N}RT}{10}}}}$$

where $S = 10.5$ and $\tilde{S}=16$ for a 64-QAM constellation.

The approximated threshold value ($S\tilde{N}RT$) may then be compared to approximate SNR values to detect whether the actual SNR is above or below the actual desired threshold value SNRT. The approximate $S\tilde{N}R$ values are indicated by the approximate signal power $\tilde{S}$ values and approximate noise power values $\tilde{N}$ generated by the power approximation circuit 216.

Figure 2:
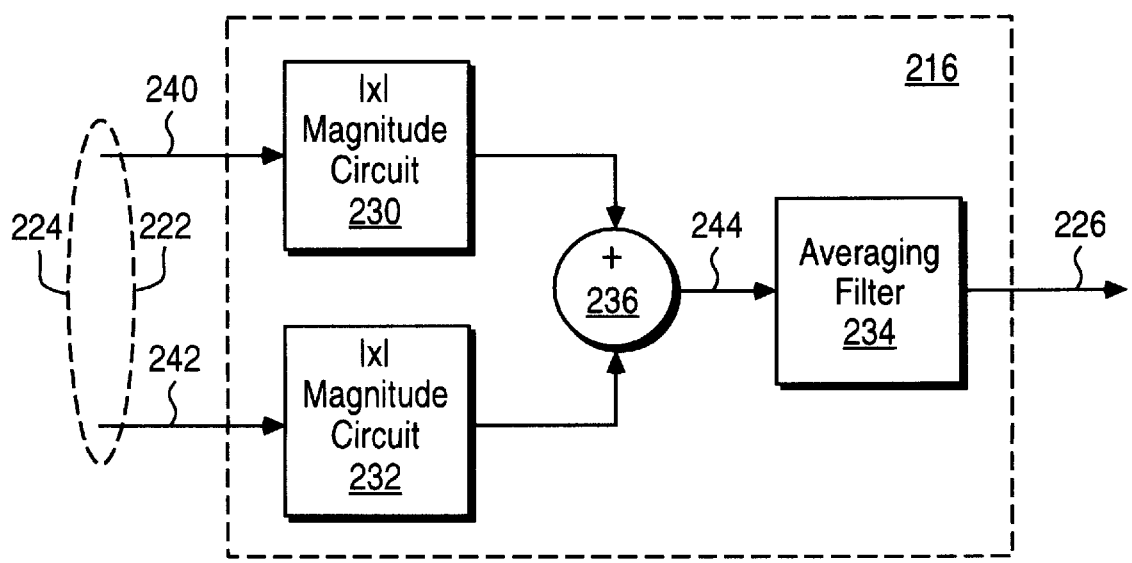
FIG. 2 illustrates one embodiment of a power approximation circuit which includes a pair of magnitude circuits, an adder circuit, and an averaging filter.

FIG. 2 illustrates one embodiment of the power approximation circuit 216 which includes a pair of magnitude circuits 230–232, an adder circuit 236, and an averaging filter 234. The elements shown are used for an approximation of square-root($\tilde{S}$) according to equation 1 and an approximation of square-root($\tilde{N}$) according to equation 2. The following description focuses on the square-root($\tilde{N}$) approximation. With the addition of the appropriate steering circuitry at the inputs of the magnitude circuits 230–232 it will be readily apparent how the elements shown may be shared for both the square-root($\tilde{S}$) and the square-root($\tilde{N}$) approximations.

In a determination of an approximate noise power square-root($\tilde{N}$), the signal line 240 carries the real part of the noise signal 224 ($n1_i$) and the signal line 242 carries the imaginary part ($n2_i$). The magnitude circuit 230 generates the absolute value of $n1_i$ and the magnitude circuit 232 generates the absolute value of $n2_i$. The magnitude circuit 230 may be implemented with an inverter and adder that generates the 2's complement of $n1_i$ and a multiplexer that selects $n1_i$ if $n1_i$ is positive or the 2's complement of $n1_i$ if $n1_i$ is negative. The magnitude circuit 232 may be implemented in a similar manner.

The output of the adder 236 is provided as an input 244 to the averaging filter 234. The averaging filter 234 generates an approximate noise power square-root($\tilde{N}$) value on the signal line 226 by performing the expectation function (E) of equations 1 and 2. The averaging filter 234 in one embodiment implements the following expectation function:

$$\sqrt{\tilde{N}_i} = a(|n1_i|+|n2_i|)+(1-a)\sqrt{\tilde{N}_{i-1}}.$$

where a is an averaging constant between 0 and 1.

In a determination of an approximate signal power $\tilde{S}$, the signal line 240 carries the real part of the output signal 222 ($x_i$) and the signal line 242 carries the imaginary part ($y_i$)

Figure 3:
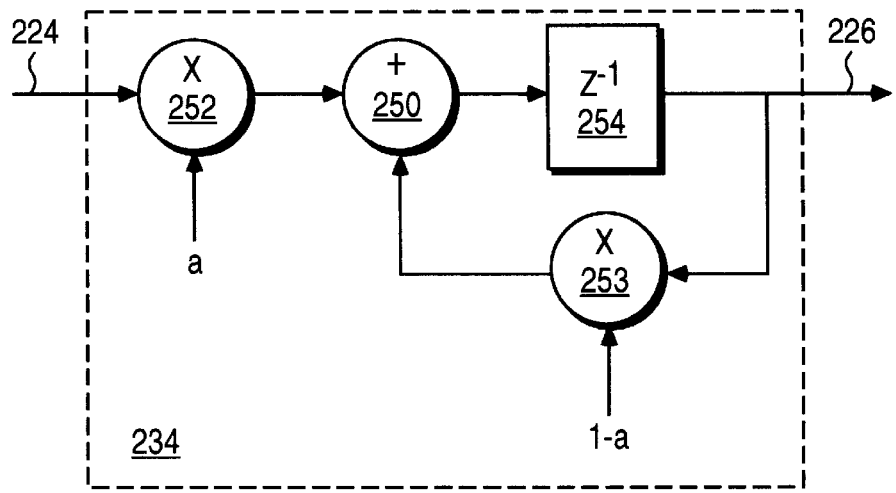
FIG. 3 illustrates one embodiment of an averaging filter for the power approximation circuit.

FIG. 3 illustrates the averaging filter 234 in one embodiment. The averaging filter 234 includes an adder 250, a pair of multipliers 252–253, and a delay element 254. The multipliers 252–253 provides an averaging constant "a" for the averaging filter 234.

Figure 4:
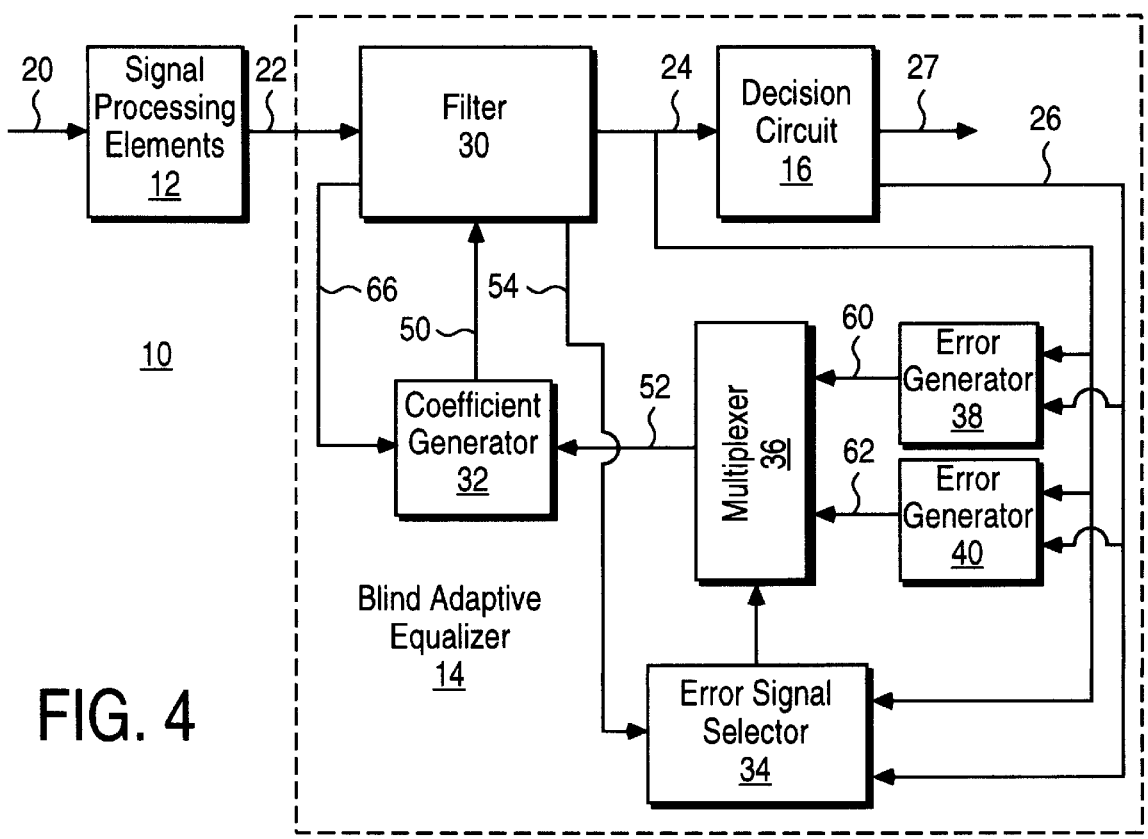
FIG. 4 illustrates a demodulator which includes a blind adaptive equalizer that switches among differing adaptation methods in response to the SNR determinations disclosed herein.

FIG. 4 illustrates a demodulator 10 which includes a blind adaptive equalizer 14 that switches among differing adaptation methods in response to the SNR determinations disclosed herein. The demodulator 10 also includes a set of signal processing elements 12 and a decision circuit 16. In one embodiment, the demodulator 10 is a 64-QAM demodulator which is characterized by a set of 64 constellation points each representing a symbol.

The signal processing elements 12 receive an information signal 20 which has been transported via a communication channel or a communication network. The communication channel or network may be embodied in one or more of a variety of physical communication paths including transmission line networks and broadcast communication channels. In one embodiment, the information signal 20 is received via an RF amplifier and associated circuitry which are coupled to a cable network.

The signal processing elements 12 perform a variety of signal processing functions to provide an input signal 22 for the equalizer 14. In one embodiment, the signal processing elements 12 include an analog-to-digital converter, an automatic gain control, a matched filter, and a timing recovery function, as well as other signal processing elements.

A filter 30 generates a filter output signal 24 in response to the input signal 22. In one embodiment, the filter 30 is a digital filter. In another embodiment, the filter 30 is a discrete time filter.

The relationship between the filter output signal 24 and the input signal 22 is defined by a transfer function associated with the filter 30. The transfer function of the filter 30 is controllable and may be adjusted by the modification of a set of filter coefficients 50 which are generated by a coefficient generator 32.

The decision circuit 16 generates an output signal 26 and an output signal 27 in response to the filter output signal 24. The output signal 27 is phase corrected and the output signal 26 is not phase corrected. The decision circuit 16 generates the phase corrected output signal 27 by performing carrier recovery on the filter output signal 24 and selecting from among a set of predetermined constellation points which best match the symbols carried by the filter output signal 24. The output signal 26 is the phase corrected output signal 27 with phase correction removed. The predetermined constellation points are each represented by a complex number. Each predetermined constellation point has a real component and an imaginary component.

The coefficient generator 32 adapts the filter 30 to distortions or imperfections in the communication channel over which the information signal 20 was transported by continuously updating the filter coefficients 50 in response to an error signal 52. The coefficient generator 32 updates the filter coefficients 50 according to the following:

$$w_n(k+1)=w_n(k)+e_{SEL}(k+1)y^*(k-n)$$

where k is time, $e_{SEL}$ is the selected error signal 52, n is the filter coefficient number (filter tap number), $w_n$ is the filter coefficient for filter tap n, and y(k−n) is the $n^{th}$ entry in the delay line 66 at time k, and "*" indicates a complex conjugate.

In addition to the equation set forth above, there are sign-based adaptation methods for generating updated filter coefficients which may be implemented in the coefficient generator 32.

The n filter taps from the filter 30 are provided to the coefficient generator 32 via a set of signal lines 66.

The error signal 52 is selected from among a set of differing error signals, N error signals in general. In one embodiment, N is 2 and the error signal 52 is selected as either an error signal 60 generated by an error generator 38 or an error signal 62 generated by an error generator 40. The equalizer 14 includes a multiplexer 36 that selects either the error signal 60 or the error signal 62 in response to a control signal 64 generated by an error signal selector 34.

The error generator 38 implements a preselected adaptation method which converges on a circle and is well suited for blind equalizers, i.e. to adaptations which are undertaken when no training symbol sequences are available in the information signal 20. The error generator 38 determines an error in the filter output signal 24 and continuously updates the error signal 60 in response to this error determination. In one embodiment, the error generator 38 performs its error determination according to a constant modulus algorithm (CMA) which is as follows:

$$e_{CMA}(k+1) = \mu_{CNA}(R_2 - |Z_k|^2) Z_k$$

where k is time, $e_{CMA}$ is the error signal 60, $\mu_{CMA}$ is a step size for the CMA algorithm, $R_2$ is a constellation dependent constant, and $Z_k$ is the filter output signal 24.

The error generator 40, on the other hand, implements an adaptation method which is decision-directed toward the constellation points for the demodulator 10. The error generator 40 determines an error in the filter output signal 24 and continuously updates the error signal 62 in response to this error determination. In one embodiment, the error generator 40 renders its error determination according a least mean-square (LMS) determination which is as follows:

$$e_{LMS}(k+1) = \mu_{LMS}(\hat{x}_k - Z_k)$$

where k is time, $e_{LMS}$ is the error signal 62, $\mu_{LMS}$ is a step size for the LMS algorithm, $\hat{x}_k$ is the output signal 26, and $Z_k$ is the filter output signal 24.

The error signals 60 and 62 are both indicators of the error between the output signal 26 and the filter output signal 24. The process by which the adaptive equalizer 14 adjusts the transfer function of the digital filter 30 in a manner that reduces the error between the output signal 26 and the filter output signal 24 is called convergence. The adaptation method provided by the error generator 38 is selected for its efficiency in converging when relatively large differences exist between the output signal 26 and the filter output signal 24 as is common at the beginning of a convergence operation when no training symbols are available. On the other hand, the adaptation method provided by the error generator 40 is selected for its efficiency in accurately converging when relatively small differences exist between the output signal 26 and the filter output signal 24.

The error signal selector 34 generates a set of status conditions and uses the status conditions to switch between the error signals 60–62, where appropriate, to properly converge the adaptive equalizer 14 and compensate for the distortions in the input signal 22 which may have been caused by imperfections in the communication channel over which the information signal 22 was transported. The status conditions generally reflect the progress of a convergence operation being undertaken. The status conditions may reflect one or more thresholds in the signal-to-noise ratio of the demodulator 10. The status conditions may also indicate whether a center tap of the filter 30 is outside of a predetermined range. The status conditions may also indicate the absence of outer rim constellation points. The error signal selector 34 uses the filter output signal 24, the output signal 26, and a center tap signal 54 from the digital filter 30 to determine the status conditions.

Figure 5:
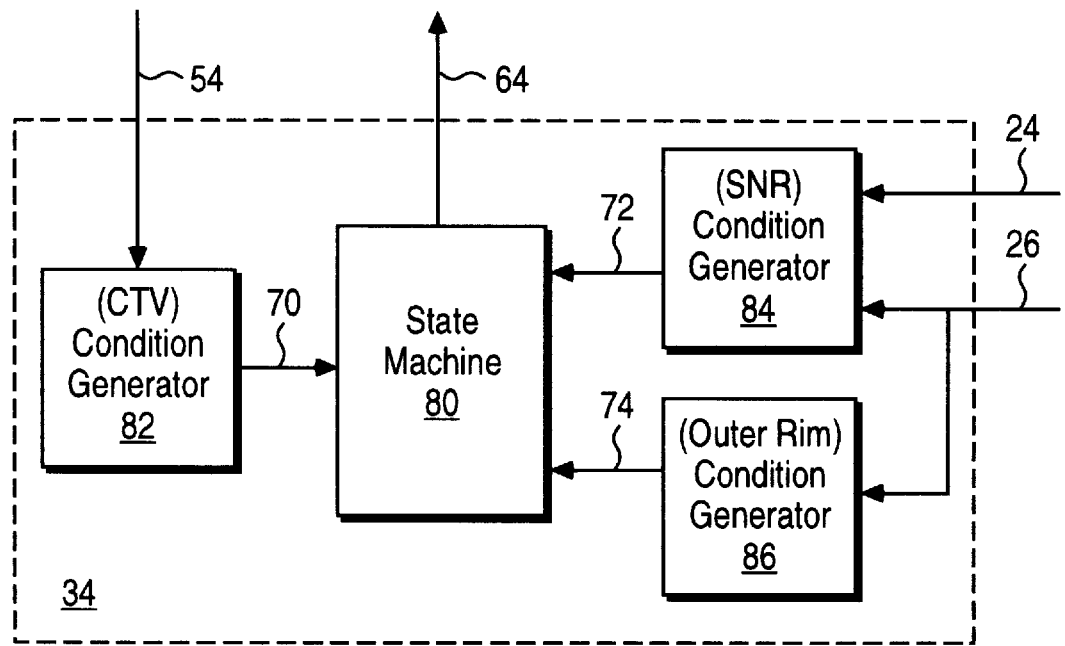
FIG. 5 illustrates a error signal selector in one embodiment.

FIG. 5 illustrates the error signal selector 34 in one embodiment. In this embodiment, the error signal selector 34 includes a state machine 80 and a set of condition generators 82–86. The state machine 80 switches the control signal 64 to select from among the error signals 60–62 in response to a set of control signals 70–74 which reflect the status conditions for a convergence operation. The control signals 70–74 are generated by the condition generators 82–86.

The condition generator 82 detects false or improper convergence states which may occur where the center tap of the digital filter 30 is too large or too small or in the wrong position. In addition, the condition generator 82 detects when the equalizer 14 is not making progress toward convergence as may be indicated when the center tap of the digital filter 30 drifts outside a predetermined range. Any one or more of these conditions may be referred to as a center tap violation (CTV). The condition generator 82 uses the center tap signal 54 from the digital filter 30 to detect a CTV and asserts the control signal 70 to indicate a CTV to the state machine 80 if one of the following conditions is true.

(|Re(C0)|<Cmin) AND (|Im(C0)|<Cmin)
(|Re (C0)|>Cmax) OR (|Im(C0)|>Cmax)
   where C0 is the complex value of the center tap signal 54, Re(C0) is the real part of C0, Im(C0) is the imaginary part of C0, Cmin is the minimum allowed center tap value, and Cmax is the maximum allowed center tap value.

The condition generator 84 uses the filter output signal 24 and the output signal 26 to determine a signal-to-noise ratio (SNR) in the demodulator 10 using the power approximation techniques disclosed herein. The signal level for the SNR determination is indicated by the signal power of the output signal 27 and the noise level for the SNR determination is indicated by the signal power of the difference between the filter output signal 24 and the output signal 26.

The condition generator 84 includes a power approximation circuit for determining approximate square-root ($\tilde{N}$) values and approximate square-root ($\tilde{S}$) values. The condition generator 84 includes elements that compare the determined approximate square-root ($\tilde{N}$) and approximate square-root ($\tilde{S}$) values to a set of approximate SNR threshold values ($\tilde{SNRT}$). The actual comparison is a comparison of a product of an $\tilde{SNRT}$ value and a square-root ($\tilde{N}$) value to an approximate square-root ($\tilde{S}$) value.

The approximate $\tilde{SNRT}$ threshold values include an upper $\tilde{SNRT}$ threshold value, a convergence S19RT threshold value, and a loss of convergence SNRT threshold value. In one embodiment, these threshold values are externally computed and stored in registers in the condition generator 84 for comparison.

The condition generator 84 indicates an Up_Threshold condition on the control signal 72 when the determined SNR is greater than the upper SNR threshold value. The Up_Threshold condition indicates that the adaptation method provided by the error generator 38, CMA in one embodiment, has obtained sufficient convergence to enable a switch to the adaptation method provided by the error generator 40, which in one embodiment is LMS.

The condition generator 84 indicates a Conv_Thresh condition on the control signal 72 when the determined SNR increases above the convergence SNR threshold value. This indicates that the adaptation method provided by the error generator 40 has obtained a high enough SNR in the demodulator 10 for a declaration of convergence by the equalizer 14.

The condition generator 84 indicates an Lconv_Thresh condition on the control signal 72 after the equalizer 14 has converged if the determined SNR dips below the loss of convergence SNR threshold value. The Lconv_Thresh condition indicates a possible loss of convergence in the equalizer 14. The condition generator 84 indicates an #Lconv_Thresh condition on the control signal 72 if the determined SNR rises above the loss of convergence SNR threshold value.

The condition generator 86 detects the lack of outer rim constellation points in the output signal 26. For example, an outer rim constellation point for 64-QAM has a real component value of 3.5 in which case the condition generator 86 detects the lack of real component values of 3.5 in the output signal 26. The condition generator 86 asserts the control signal 74 to indicate a No_Outer_Rim condition if an outer rim value has not been detected within a predetermined number of previous symbols carried by the output signal 26. In one embodiment, the condition generator 86 includes a counter which counts symbols and resets and reloads with a predetermined value whenever an outer rim value occurs. If this counter expires then the No_Outer_Rim condition is generated.

The No_Outer_Rim condition is used by the state machine 80 to prevent a false convergence of the equalizer 14. If a false convergence occurs, the converged constellation is a smaller and noisier version of the actual constellation for the demodulator 10. The lack of outer rim values is an indication of possible convergence to a false constellation.

Figure 6:
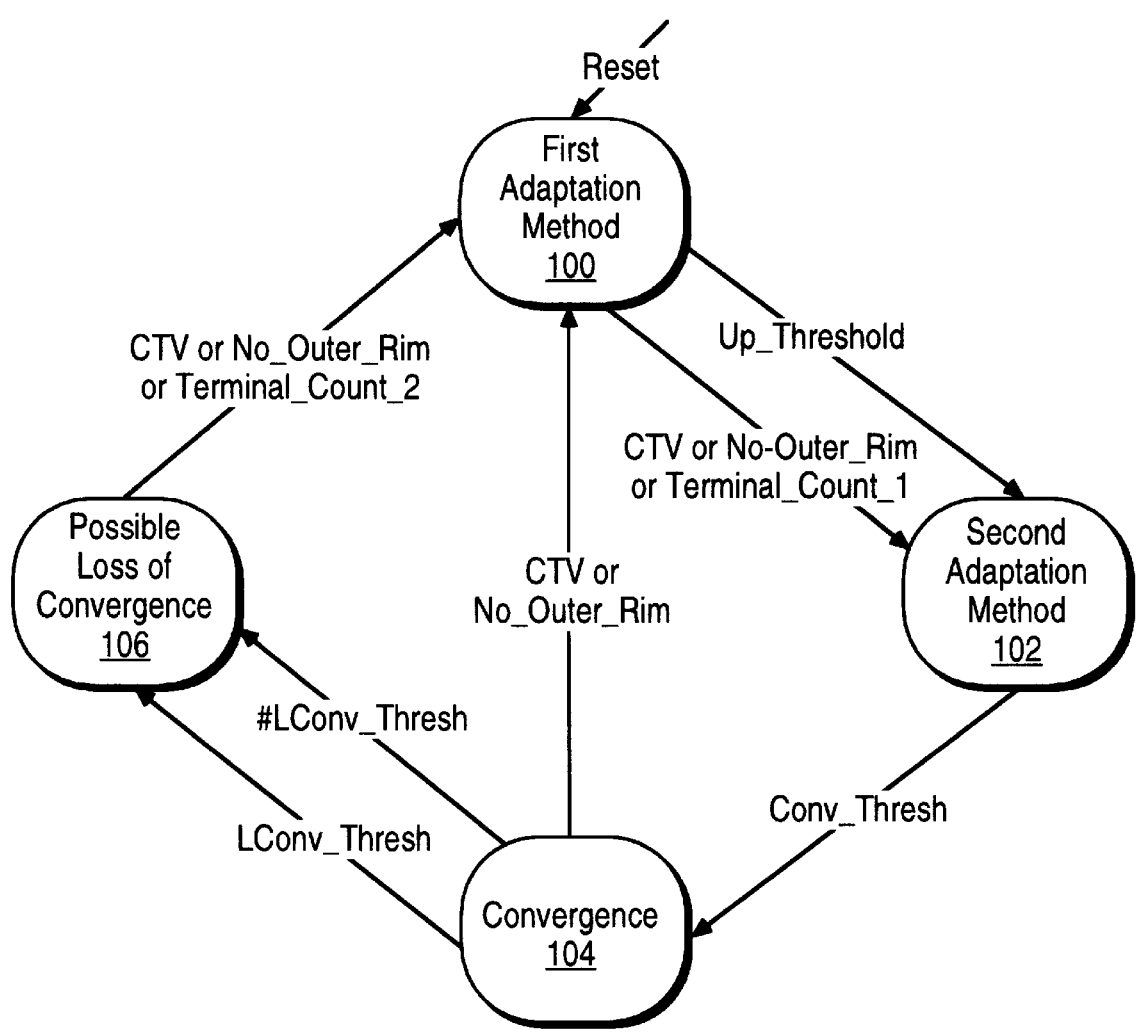
FIG. 6 is a diagram that shows state transitions of a state machine in one embodiment of an error signal selector.

FIG. 6 is a diagram that shows the state transitions of the state machine 80 in one embodiment. The states of the state machine 80 include a first adaptation method state 100, a second adaptation method state 102, a convergence state 104, and a possible loss of convergence state 106. Also shown are the status conditions as indicated on the control signals 70–74 that cause transitions among the states 100–106.

The state machine 80 enters the first adaptation method state 100 at reset or initialization. While in the state 100, the state machine 80 uses the control signal 64 to select the error signal 60 from the error generator 38 for use by the coefficient generator 32. In one embodiment, this results in the use of the CMA adaptation method when updating the filter coefficients 50. The state machine 80 remains in the first adaptation method state 100 so that the equalizer 14 uses the error signal 60 to converge until the condition generator 84 signals the Up_Threshold condition. The Up_Threshold condition causes the state machine 80 to transition to the second adaptation method at state 102.

While in the state 102, the state machine 80 uses the control signal 64 to select the error signal 62 from the error generator 40. In one embodiment, this results in the use of the LMS adaptation method when updating the filter coefficients 50. The state machine 80 transitions from the state 102 to the convergence state 104 once the condition generator 84 signals the Conv_Thresh condition. This indicates that the SNR in the demodulator 10 is high enough to declare the convergence of the equalizer 14. On the other hand, the state machine 80 falls back from the state 102 to the state 100 if the condition generator 82 signals the CTV condition or if the condition generator 86 signals the No_Outer_Rim condition.

The state machine 80 includes a first counter which is loaded with a value indicating a maximum number of symbols for which the equalizer 14 will attempt to converge using the adaptation method of the error generator 40 in the state 102. While in the state 102, the state machine 80 decrements the first counter for each symbol. If the first counter expires while in the state 102 then the Terminal_Count_1 condition is indicated and the state machine 80 falls back to the state 100 to restart the convergence process.

In the convergence state 104 the output signal 26 is considered to have good data and the state machine 80 continues to select the error signal 62 to maintain convergence. A CTV or a No_Outer_Rim indication in the convergence state 104 causes the state machine 80 to fall all the way back to the state 100 to restart the convergence process. While in the convergence state 104, the Lconv_Thresh condition from the condition generator 84 causes the state machine 80 to transition to the possible loss of convergence state 106.

While in the possible loss of convergence state 106, the state machine 80 continues to select the error signal 62 for use by the coefficient generator 32. A subsequent #Lconv_Thresh condition from the condition generator 84 restores the state machine 80 to the convergence state 104. This maintains the use of the more finely tuned adaptation method of the error generator 40 in case the reduced SNR was caused by short term effects on the communication channel that transports the information signal 20.

A CTV condition or a No_Outer_Rim condition causes the state machine 80 to fall out of the possible loss of convergence state 106 to the state 100 to restart the convergence process. The state machine 80 includes a second counter which is loaded with a value indicating a maximum number of symbols for which the equalizer 14 will attempt to re-attain convergence while in the possible loss of convergence state 106. While in the possible loss of convergence state 106, the state machine 80 decrements the second counter for each symbol. If the second counter expires as indicated by the Terminal_Count_2 condition then the state machine 80 transitions to the state 100 to restart the convergence process.

Figure 7:
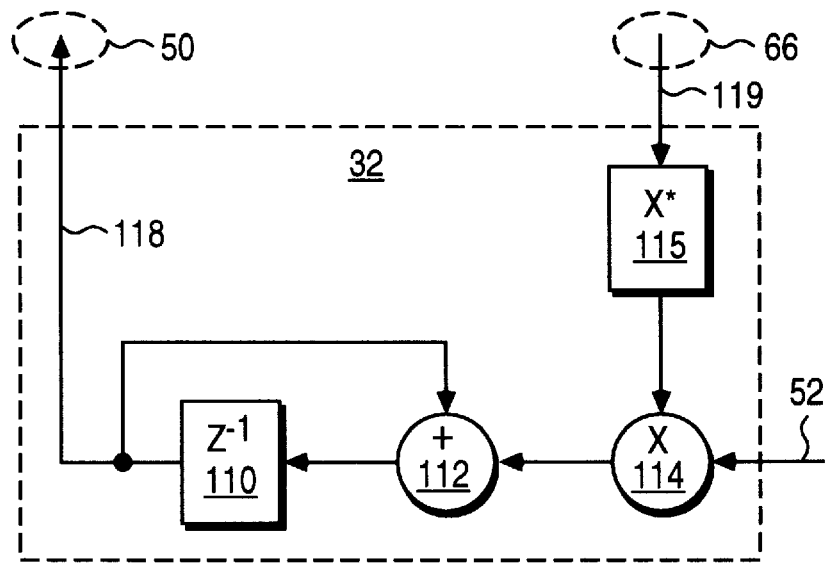
FIG. 7 illustrates elements of a coefficient generator in one embodiment.

FIG. 7 illustrates elements of the coefficient generator 32. The coefficient generator 32 includes a delay element, an adder, a complex conjugate block, and a multiplier for each of the filter coefficients 50. For generating a filter coefficient 118, the coefficient generator 32 includes a delay element 110 such as a register or flip-flop, an adder 112, a multiplier 114 and a complex conjugate block 115.

The complex conjugate block 115 generates a conjugate of a corresponding filter tap 119. The multiplier 114 multiplies the output of the complex conjugate block 115 by the selected error signal 52. The delay element 110 stores a previous coefficient w(k) and the adder 112 generates an updated coefficient w(k+1) by adding the previous coefficient w(k) to the output of the multiplier 114. The output of the delay element 110 provides the filter coefficient 118 for the corresponding filter tap 119.

The filter 30 may be implemented in a variety of arrangements including a simple feed-forward filter and a filter having feed-forward and feed-back elements. In one embodiment, the filter 30 includes a feed-forward filter from the input signal 22 and a feed-back filter from the output signal 26. The outputs of the feed-forward and feedback filter are summed to provide the filter output signal 24. The center tap signal 54 is the last tap in the feed-forward filter.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An electronic system, comprising:

means for generating an absolute value of a real part of a signal;

means f or generating an absolute value of an imaginary part of the signal;

means for generating a sum of the absolute values;

means for performing an averaging function on the sum such that a result of the averaging function provides an approximate power which indicates an actual power of the signal.

2. The electronic system of claim 1, wherein the approximate power enables a detection of at least one signal-to-noise ratio threshold in the electronic system.

3. The electronic system of claim 1, further comprising means for mapping the approximate power to an actual power.

4. The electronic system of claim 3, wherein the means for mapping comprises a lookup table having a set of entries each of which corresponds to a particular actual signal-to-noise ratio value and each entry having an approximate power which maps to a corresponding actual power.

5. The electronic system of claim 1, wherein the signal is a noise signal which indicates a difference between an output signal of the electronic system and an input signal in the electronic system such that the approximate power provides an approximate power of the noise signal which indicates an actual power of the noise signal.

6. The electronic system of claim 1, wherein the signal is an output signal of the electronic system such that the approximate power provides an approximate power of the output signal which indicates an actual power of the output signal.

7. The electronic system of claim 1, wherein the signal is a noise signal which indicates a difference between an output signal of a decision circuit in a demodulator and an input signal to the decision circuit such that the approximate power provides an approximate power of the noise signal which indicates an actual power of the noise signal.

8. The electronic system of claim 7, wherein the approximate power of the noise signal indicates a quality of a communication channel to the demodulator.

9. The electronic system of claim 8, wherein the approximate power of the noise signal enables a detection of at least one signal-to-noise ratio threshold in the demodulator.

10. The electronic system of claim 9, wherein the signal-to-noise threshold is used to switch among differing error determinations in a blind adaptive equalizer for the demodulator.

11. The electronic system of claim 7, further comprising means for mapping the approximate power of the noise signal to an actual power of the noise signal.

12. A power approximation circuit, comprising:

first magnitude circuit that generates an absolute value of a first signal which carries a real component of a complex signal;

second magnitude circuit that generates an absolute value of a second signal which carries an imaginary component of the complex signal;

summing circuit that generates a signal that carries a sum of the absolute values of the first and second signals;

averaging filter that generates an approximate power value in response to the signal that carries the sum, the approximate power value indicating an actual power value for the complex signal.

13. The power approximation circuit of claim 12, wherein the approximate power value is used to detect at least one signal-to-noise ratio threshold in a demodulator.

14. The power approximation circuit of claim 12, further comprising a lookup table which maps the approximate power value to an actual power value.

15. The power approximation circuit of claim 12, wherein the complex signal is a noise signal in a demodulator such that the approximate power value indicates an actual power value for the noise signal.

16. The power approximation circuit of claim 12, wherein the complex signal is an output signal of a decision circuit in a demodulator such that the approximate power value indicates an actual power value for the output signal.

* * * * *